US010562190B1

(12) United States Patent
Lee et al.

(10) Patent No.: US 10,562,190 B1
(45) Date of Patent: Feb. 18, 2020

(54) TACTILE SENSOR APPLIED TO A HUMANOID ROBOTS

(71) Applicant: NATIONAL CENTRAL UNIVERSITY, Taoyuan (TW)

(72) Inventors: Ju-Yi Lee, Taipei (TW); Hong-Yih Yeh, New Taipei (TW); Ying-Kai Hsu, Taichung (TW); An-Chi Wei, Taoyuan (TW)

(73) Assignee: National Central University, Taoyuan (TW)

( * ) Notice: Subject to any disclaimer, the term of this patent is extended or adjusted under 35 U.S.C. 154(b) by 0 days.

(21) Appl. No.: 16/186,850

(22) Filed: Nov. 12, 2018

(51) Int. Cl.
*G06T 7/521* (2017.01)
*B25J 13/08* (2006.01)
*B25J 19/02* (2006.01)
*G06T 7/40* (2017.01)
*G06T 7/73* (2017.01)

(52) U.S. Cl.
CPC .......... *B25J 13/084* (2013.01); *B25J 19/023* (2013.01); *G06T 7/521* (2017.01); *G06T 7/40* (2013.01); *G06T 7/73* (2017.01)

(58) Field of Classification Search
CPC ....... B25J 13/084; B25J 19/023; G06T 7/521; G06T 7/40; G06T 7/73
See application file for complete search history.

(56) References Cited

U.S. PATENT DOCUMENTS

| 4,859,081 A * | 8/1989 | Kabayashi | G01K 1/16 374/179 |
| 2002/0167641 A1* | 11/2002 | Fukuma | A61B 3/032 351/204 |
| 2003/0178556 A1* | 9/2003 | Tachi | G01L 1/247 250/227.11 |
| 2007/0040107 A1* | 2/2007 | Mizota | B25J 13/084 250/221 |
| 2010/0117978 A1* | 5/2010 | Shirado | B25J 13/084 345/173 |
| 2013/0236850 A1* | 9/2013 | Wu | A61B 1/00172 433/29 |
| 2018/0106676 A1* | 4/2018 | Jang | G02B 7/02 |
| 2019/0064013 A1* | 2/2019 | Kandori | G01L 1/255 |

* cited by examiner

*Primary Examiner* — Shawn S An
(74) *Attorney, Agent, or Firm* — Rosenberg, Klein & Lee

(57) ABSTRACT

The tactile sensor of the present disclosure is an indirect optical sensor, comprising a frame, a sensing plate, a single beam LED light source, a miniature camera, and a grating plate in the sensing plate and the single light source illuminates the grating plate. Geometric interference fringes caused by the shadows of gratings and gratings, images taken by a miniature camera, through an innovative instantaneous steps phase shifting technique, which eliminates the need for any mechanical phase shifting device to detect the pressure and space. The position is measured and has fast and accurate tactile sensing. The advantage of this method is that directly shooting the moiré image while calculating the spatial position, temperature, and pressure. Instantaneous steps phase shifting technique can solve the problems of traditional mechanical stepping, non-instant and complex operation problems.

5 Claims, 9 Drawing Sheets

TACTILE SENSOR APPLIED TO A HUMANOID ROBOTS

THE FIELD OF THE DISCLOSURE

The present disclosure relates to sensors, and more particularly, to a tactile sensor device.

BACKGROUND AND RELATED ART

Sensor technologies advance over the past two decades, there are different types of sensors such as temperature sensor, proximity sensor, accelerometer, IR sensor (Infrared Sensor), pressure sensor, light sensor etc. Sensors have been applied to many applications product design, process optimization, and research and development.

Tactile sensors are useful in a wide variety of robot applications. There are two types of robots, namely, industrial robots and humanoid robots. Industrial robots can repeatedly perform given tasks according to a preplanned program, while humanoid robots will eventually work along humans if they understand human intelligence, and act like humans. Since humanoid robots are expected to simulate the human structure and behavior, they are more complex than industrial robots. For example, a humanoid robot is expected to reach its goal while adapting to the changes in its environment which require autonomous learning and safe interaction, among many other things, unlike industrial robots. Tactile sensors provide useful information about the state of contact between a humanoid robot hand and an object in prehension. They can indicate the presence or shape of an object, its location in the hand, and the force of contact. Tactile sensors may be of different types including piezoresistive, piezoelectric, capacitive and optical sensors. The present disclosure related to optical sensors in general, optical sensors have advantages of no cable and anti-electromagnetic interference, and they are divided into direct and indirect optical sensing method. Direct optical sensing method uses optical fiber to sense the reflected light intensity to determine the magnitude of the tactile pressure. While the indirect optical sensing methods need no optical fiber to sense the reflected light intensity to determine the magnitude of the tactile pressure. Therefore, the present disclosure is further related to an indirect optical sensing method in particular.

Some related art introduced a piezoresistive pressure tactile sensor robot system comprising a hand with a tactile sensor, a tactile information processing unit, a robot controller, etc., wherein the sensing unit of the tactile sensor is composed of a plurality of pressure sensors, respectively detecting the pressure and a plurality of pressure sensors, each detecting its spatial position. Other related arts disclosed a sensing device combining a piezoresistive and capacitive haptic function, wherein the dielectric material layer comprises an elastic colloidal material, and a capacitance detecting circuit sequentially or randomly applies a touch capacitive sensing excitation signal to the selected first sensing electrode for proximity and touch detection operations; In the proximity and touch detection operation, it is assisted by the inductive excitation signal of the touch capacitor, a signal is applied to the opposite at least one second electrode; during the pressure detecting operation, a pressure capacitive sensing excitation signal is applied to the at least one second sensing electrode, and a corresponding excitation signal is sequentially or randomly applied to the selected one. Therefore, the present disclosure provided a tactile sensor that sensed reflected light to determine the presence of an object which few or none of the related art disclosed.

SUMMARY

According to an embodiment of the present disclosure, there is provided a tactile sensor device applied to humanoid robots using a shadow moiré sensing technology. Its architecture is composed of a single-beam illumination, a sensing module and a miniature camera. The sensing module is composed of a Polydimethylsiloxane (PDMS) sensing plate as the top layer disposed on a polymethyl methacrylate (PMMA) grating plate, and there is an air-layer between the sensing plate and the grating plate. The grating plate is disposed on a single beam LED light source and a miniature camera. Both the LED and the miniature camera are placed in a vertical direction facing the grating plate, and the LED is disposed with the grating plate at an offset of 45 degrees angle. The geometric interference fringes caused by the shadow of the grating are captured by the miniature camera through an innovative instantaneous steps phase shifting technique.

According to the embodiment of the present disclosure, provides an innovative instantaneous steps phase shifting technology that can be completed in real time without any mechanical phase shifting device measuring of shift or deformation information. The disclosure has a fast and accurate sense of touch, no need for any mechanical phase shift device to do moiré pattern analysis, the tactile pressure and spatial position measurement.

The methods used in this invention including shadow overlay, instantaneous steps phase shifting shadow overlay technique, structural design and fabrication of the tactile sensor board, temperature sensing structure design and tactile sensor integrated design. Among them, the instantaneous steps phase shifting shadow overlay technology and temperature sensing structure designs are the innovative highlights of this disclosure.

It is therefore, an object of the present disclosure to provide an indirect optical tactile sensor device composed of the structure herein.

It is an object of the present disclosure to provide an indirect optical tactile sensor device which directly takes moiré technique and calculates the spatial position, temperature and pressure.

It is an object of the present disclosure to provide an indirect optical tactile sensor device having instantaneous steps phase shifting technology that solved non-real-time and complex problems that required in convention method with mechanical to move the actuator.

It is an object of the present disclosure to provide an indirect optical tactile sensor device which accurately measuring the temperature of the sensing plate from the image captured by the miniature camera, a thermochromic paint is placed on the sensing plate and its color changes according to the temperature of the sensing plate.

It is an object of the present disclosure when the tactile sensor device is grabbing hard objects of various shapes (such as caps, pencils, etc.), the characteristics can be measured and analyze directly by the tactile sensor device.

BRIEF DESCRIPTION OF THE DRAWINGS

The features and importance of the embodiments of the present disclosure will become more apparent from the detailed description set forth below when combining with the drawings. Naturally, the drawings and their associated descriptions show example arrangements within the scope of the claims and do not limit the scope of the claims. Reference numbers are reused throughout the drawings to indicate correspondence between referenced elements.

DETAILED DESCRIPTION

In order to make the structure and characteristics as well as the effectiveness of the present disclosure to be further understood and recognized, the detailed description of the present disclosure is provided as follows along with embodiments and accompanying figures.

Figure 1A:
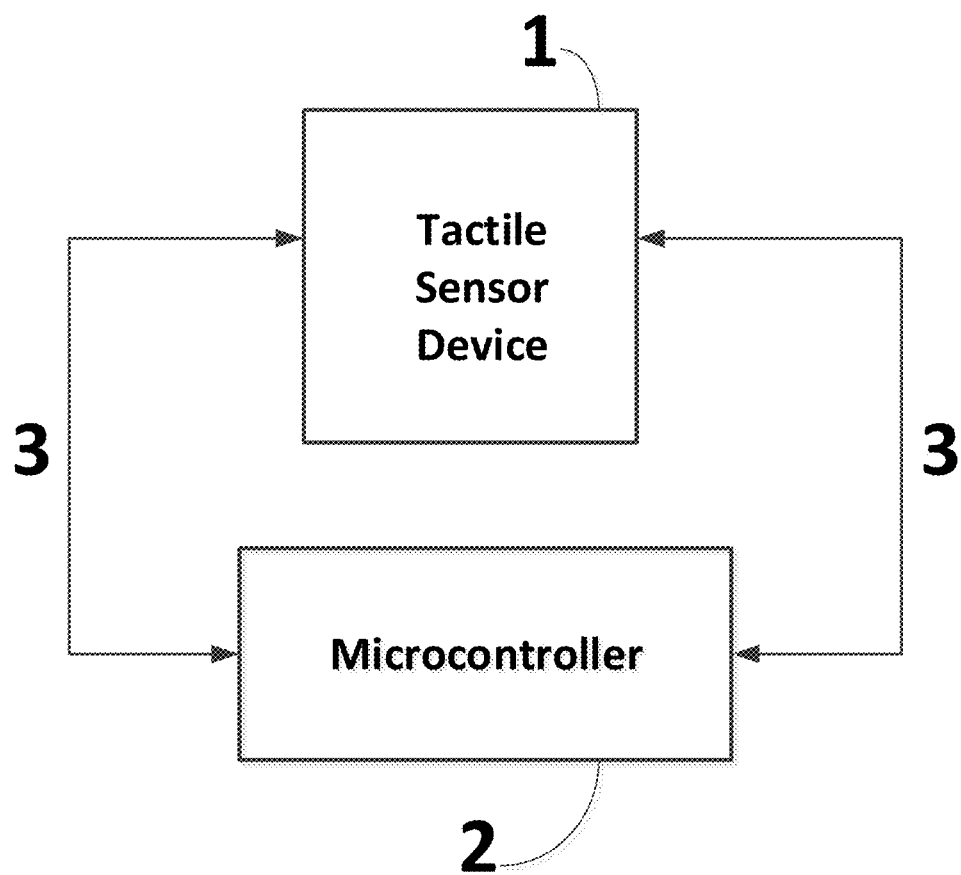
FIG. 1A shows a block diagram of the tactile sensor device according to various embodiment of the present disclosure.
Figure 1B:
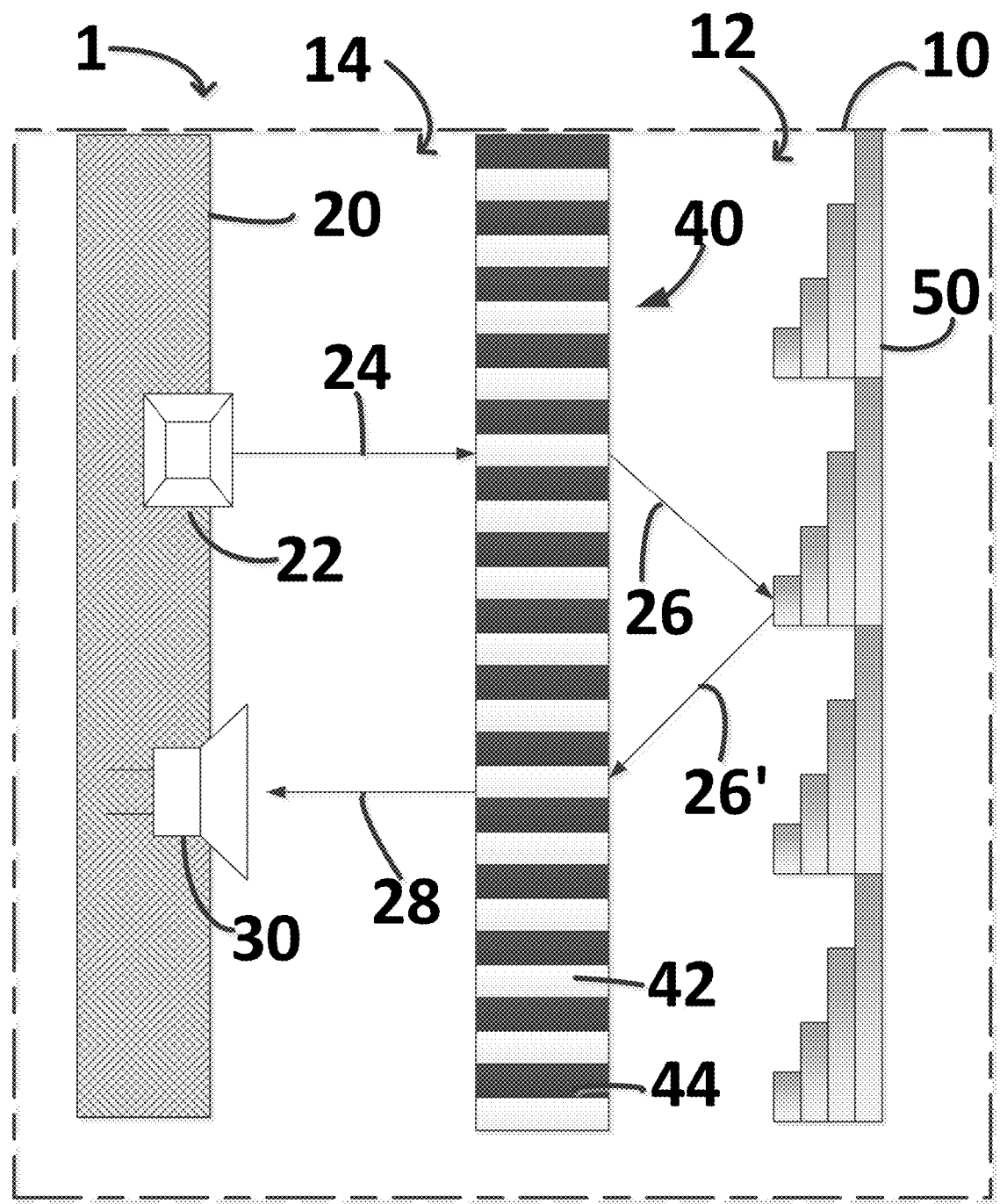
FIG. 1B shows a structural diagram of the tactile sensor device according to various embodiment of the present disclosure.

Please refer to FIGS. 1A and 1B which show a block and a structural diagram of the tactile sensor device of the proposed tactile sensor device applied to a humanoid robot according to various embodiment of the present disclosure, the tactile sensor device 1 is connected to a microcontroller 2 by power lines 3. The microcontroller 2 is very small and it can be placed in the palm of a hand or just somewhere not too far away from the tactile sensor device 1. The microcontroller 2 controls the tactile sensor device 1. The power control lines 3 are extended to connect the microcontroller 2 and the tactile sensor device 1.

The tactile sensor device 1 of the present disclosure is composed of a hollow frame 10 which is a rectangular shape in which components can be placed. The hollow frame 10 contained a substrate 20 positioned inside as the innermost layer, a single beam LED light source 22 mounted on the substrate 20, a grating plate 40 disposed on the direction of the single beam LED light source 22 as the middle layer, and a sensing plate 50 disposed on the grating plate 40 as the outermost layer and there is an air-layer 12 between the grating plate 40 and the sensing plate 50, and further, there is another air-layer 14 between the grating plate 40 and the substrate 20.

The hollow frame 10 is a very important component and its outer shape needs to be mated with the joint of a human or a mechanical finger. The volume of the hollow frame 10 is identical to the joint of a human or a mechanical finger. Since the robots are always active, their vibrations are inevitable. Therefore, the design of the entire frame needs to be quite precise and robust and that is one aspect this disclosure can provide.

In various embodiments of the present disclosure, the single beam LED light source 22 is a small LED light source mounted on the substrate 10. The single beam LED light source 22 is controlled by the microcontroller 2 to generate a light beam 24 that passes through the grating plate 40. The single beam LED light source 22 is aligned with the grating plate 40 at forty-five degree (45°) angle to allow the first plurality of fringes 26 generated from the grating plate 40 to cause shadows on the sensing plate 50.

The grating plate 40 is sandwich between the single beam LED light source 22 and the sensing plate 50, it is an optical component with a periodic structure that interferes and splits the light beam 24 generated from the single beam LED light source 22 into the first plurality of fringes 26 traveling in different directions towards the sensing plate 50. The grating plate 40 is made up of a polymethyl methacrylate (PMMA) material, which allows the grated shadow of the fringes caused by the grating plate 40 to be reflected by the sensing plate 50 through an innovative instantaneous phase shifting technique on the sensing plate 50. The grating plate 40 is used as the light beam 24 interference and is composed of a plurality of openings 42 and plurality of obstacles 44.

The sensing plate 50 is positioned as the outermost layer, and it is made up of Polydimethylsiloxane (PDMS) material. There is an air-layer 12 between the sensing plate 50 and the grating plate 40, and because of the air-layer 12 between the sensing plate 50 and the grating plate 40, when a robot fingers or human fingers grab an object, the object will squeeze the sensing plate 50 to be closer to the grating plate 40 and causes changes in the moiré fringes through an innovative instantaneous steps phase shifting technique, without any mechanical movement making the first plurality of fringes 26 reflected back to the grating plate 40. The reflected fringe 26' passes through the grating plate 40 and generates a second plurality of fringes 28. The sensing plate 50 must be aligned accurately with the grating plate 40 to make the fringes of the grating plate 40 cause shadows on the sensing plate 50, and create a double-grain, which allowed the miniature camera 30 to capture the overlay.

The miniature camera 30 is a key component in capturing the second plurality of fringes 28. The miniature camera must be small enough to be mounted on the substrate 20 and must have a built-in lens and a standard communication format to communicate with the microcontroller 2. The lens also must be aligned vertically with the grating plate 40 to capture accurately the second plurality of fringes shadow overlay image and send the signal to the microcontroller 2 to processes. The miniature camera 30 is controlled by the microcontroller 2 through the power control lines 3 to capture the second plurality of fringes 28 diffracted from the grating plate 40. The microcontroller 2 electrically connects to the miniature camera 30, when the sensor is in contact with an object, the microcontroller 2 processes the images captured by the miniature camera and determine the characteristics of the surface touched by an object and other physical properties, including the strength and spatial distribution of the force or pressure, the shape and position of the object, and the surface texture.

Figure 2:
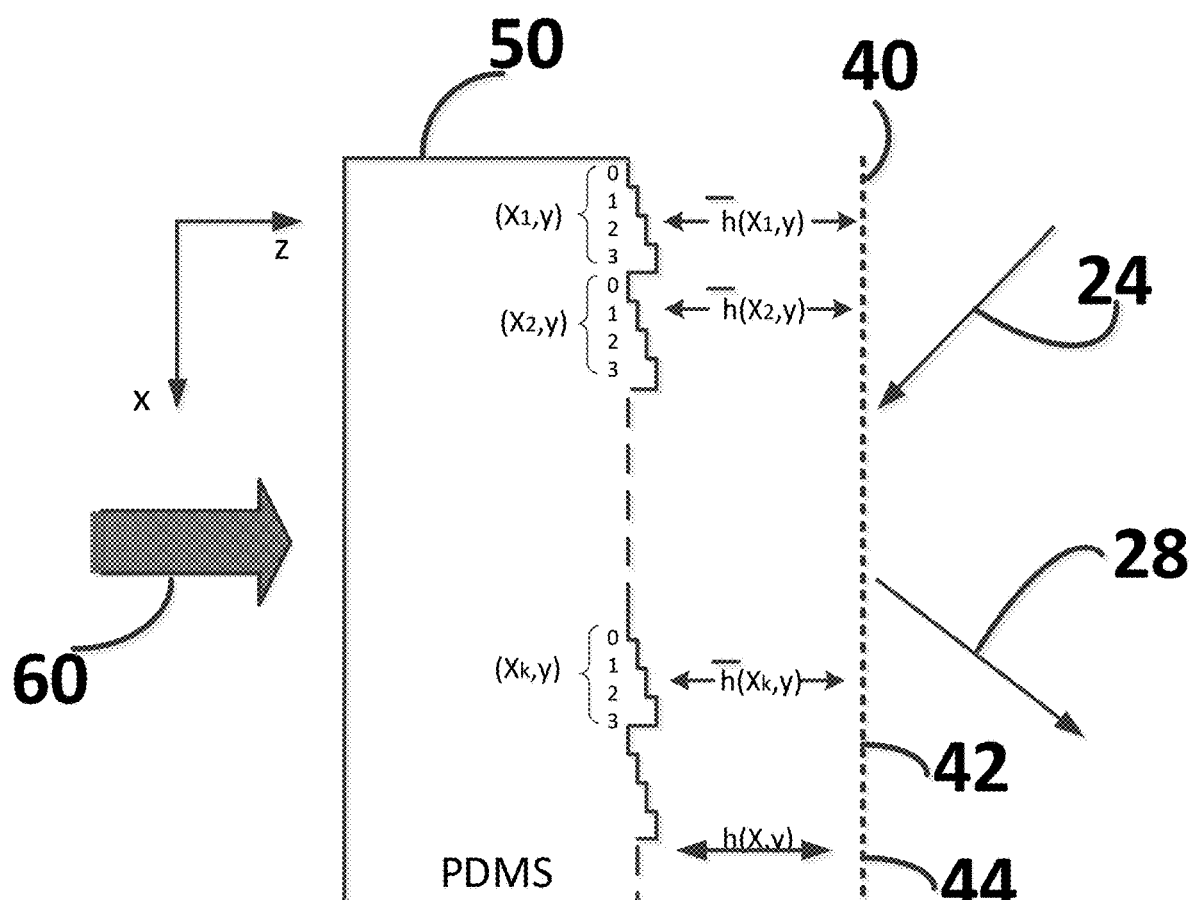
FIG. 2 shows an instantaneous steps phase shifting technique of the tactile sensor device according to various embodiment of the present disclosure.

Please refer to FIG. 2, which shows an instantaneous steps phase shifting technique of the tactile sensor according to various embodiment of the present disclosure. The sensing plate 50 including plurality of periodic stair-steps phase structure is arranged in a straight line, each stair-step is corresponding to an opening 42 on the grating plate 40 and each light beam phase 24 has a light intensity difference of 90° angle out of phase from the other.

Nowadays, there are various measurement techniques for component topography, in which the moiré method has the advantages of economy, simplicity and speed, and has become a commonly used measurement technology in the industry.

In general, moiré is an optical stripe of light intensity distribution that is an optical phenomenon produced by an overlap of two periodic gratings. The geometric parameters of the two gratings determine the period, phase and degree of bending of the moiré. In other words, if you attach one of the gratings when it is combined with the object 60 to be touched, the geometric parameters of the grating can be reversed by measuring the period, phase or degree of curvature, and then obtaining the geometric parameters of the component to be touched.

Shadow overlay is an optical stripe produced by the shadow of the grating and itself. It has been widely used to measure the surface topography of objects. Its working principle is as follows. A collimated beam of light is incident on a grating at an incident angle $\theta_1$, and the shadow of the grating is projected on the surface of the object 60 to be touched. The shadow overlay is then observed by the camera at a $\theta_2$ viewing angle on the other side of the incident light. Assuming that the grating period is p, the raster image (light intensity distribution) observed by the camera is:

$$t_2 = 1 + \cos\left(\frac{2\pi}{p}x\right) \quad (1)$$

assuming a background intensity of equation (1). On the other hand, the shadow of the grating projected on the object 60 to be touched will produce phase distortion $\psi(x,y)$ due to the surface topography of the object 60 to be touched, and its form can be written as:

$$t_2 = 1 + \cos\left(\frac{2\pi}{p}x + \psi(x, y)\right) \quad (2)$$

Assuming that the height of the observation point $P_1$ on the object 60 to be touched is different from the grating, h is the distance between the grating and the shadow observed at the camera angle is:

$$u = u_1 + u_2 = h(x,y)(\tan\theta_1 + \tan\theta_2) \quad (3)$$

This distance is the topography of the surface of the object 60 to be touched, which will cause the surface to be deformed $\psi(x, y)$, the form can be written as:

$$\psi(x, y) = \frac{2\pi u}{p}, \quad (4)$$

from the perspective of the camera, the observed light intensity distribution of the grating and its shadow can be written as:

$$t(x, y) = t_1 t_2 = a^2 \left\{ 1 + \cos\frac{2\pi}{p}x + \cos 2\pi \left[\frac{x}{p} + \psi(x)\right] + \frac{1}{2}\cos 2\pi \left[\frac{2x}{p} + \psi(x)\right] + \frac{1}{2}\cos 2\pi \psi(x) \right\} \quad (5)$$

In the above equation (5), the first three terms are high frequency terms related to the grating period, and the last one is a low-frequency term, which is purely related to the phase deformation introduced by the surface topography of the object 60 to be touched, which is observed by the camera. In general, the intensity of this form of the overlay can be simplified as:

$$I = A[1 + V\cos(\psi(x, y))] = A\left[1 + V\cos\left(\frac{2\pi}{p}h(x, y)(\tan\theta_1 + \tan\theta_2)\right)\right] \quad (6)$$

$$= A\left[1 + V\cos\left(\frac{2\pi}{p/(\tan\theta_1 + \tan\theta_2)}h(x, y)\right)\right]$$

$$= A\left[1 + V\cos\left(\frac{2\pi}{\bar{p}}h(x, y)\right)\right]$$

where A and V represent the background intensity of the moiré and the contrast of the stripes. The condition of the rubbing bright line appears when the phase of the cos term of the above equation (6) is an integer multiple of $2\pi$, that is, the condition of the superimposed bright lines is that the phase of the cos term of the above equation (6) is an integral multiple of $2\pi m$.

$$\frac{2\pi}{p/(\tan\theta_1 + \tan\theta_2)}h(x, h) = 2\pi m, \text{ or } h(x, y) = \frac{mp}{(\tan\theta_1 + \tan\theta_2)} \quad (7)$$

The order m and its position (x, y) that can appear according to the superimposed bright lines to set the surface height distribution h(x, y) of the object 60 to be touched.

The overlay signal carries the information of the surface topography h(x, y) of the object 60 to be touched, and can also be obtained by image processing to analyze the overlay intensity distribution. The conventional stripe analysis technique is the phase shift method, which is explained as follows:

In the above equation (6), we define the period of the moiré as $\bar{p}=p/(\tan\theta_1+\tan\theta_2)$ that is, for every $\bar{p}$ increases, the period of the moiré changes by $2\pi$. A precise mobile platform can be used to push the grating up step by step, with each movement moving a quarter of the moiré cycle, which is $\bar{p}/4$. The intensity distribution of the moiré image formed by each step of movement can be written as:

$$I_1 = A\left[1 + V\cos\left(\frac{2\pi}{\bar{p}}(h(x, y) + 0)\right)\right] = A\left[1 + V\cos\left(\frac{2\pi}{\bar{p}}h(x, y)\right)\right], \quad (8)$$

$$I_2 = A\left[1 + V\cos\left(\frac{2\pi}{\bar{p}}\left(h(x, y) + \frac{\bar{p}}{4}\right)\right)\right] = A\left[1 - V\sin\left(\frac{2\pi}{\bar{p}}h(x, y)\right)\right], \quad (9)$$

$$I_3 = A\left[1 + V\cos\left(\frac{2\pi}{\bar{p}}\left(h(x, y) + \frac{\bar{p}}{2}\right)\right)\right] = A\left[1 - V\cos\left(\frac{2\pi}{\bar{p}}h(x, y)\right)\right], \quad (10)$$

$$I_4 = A\left[1 + V\cos\left(\frac{2\pi}{\bar{p}}\left(h(x, y) + \frac{3\bar{p}}{4}\right)\right)\right] = A\left[1 + V\sin\left(\frac{2\pi}{\bar{p}}h(x, y)\right)\right], \quad (11)$$

Then, the four intensity distribution information is calculated as follows to obtain the surface topography h (x, y) of the object 60 to be touched.

$$h(x, y) = \frac{\bar{p}}{2\pi} \times \tan^{-1}\frac{I_4 - I_2}{I_1 - I_3} = \frac{p/(\tan\theta_1 + \tan\theta_2)}{2\pi} \times \tan^{-1}\frac{I_4 - I_2}{I_1 - I_3}. \quad (12)$$

Regarding the instantaneous steps phase shifting technique of the present disclosure, the steps algorithm can, therefore, be used to analyze the sheared wavefront. These interferograms with 90° phase shifts can be recorded and wavefront can be calculated with the steps algorithm. The sensing plate 50 of the present disclosure composed a step height structure on the surface of the topography change sensing surface. This structure comprising a plurality of heights, the phase differences between the steps is equal to a quarter of the moiré cycle, and every four steps form a group, which fills the entire shape sensing surface. For convenience, the applicant numbered these step height structures along the x-axis, as shown in FIG. 2. On the x-axis, the original continuous coordinate position x, has been changed to a discontinuous $X_k$ (k=1, 2 . . . ) in each $X_k$ region, there are plurality of different heights structure. Assuming that the spatial variability of the surface topography in the $X_k$ region is small, the height of the region can be expressed by the average height $\bar{h}(X_k, y)$. The same operation method is used to obtain an average height of the area. That is, the average height of each area is calculated instantaneously through the image capturing system so that the surface topography of the entire sensing surface can be obtained. When said sensing plate 50 grasps the object 60, the first plurality of fringes on each step reflects back to grating plate 40, the reflected fringes passing through the grating plate 40 and then generated a second plurality of fringes 28 captured by the miniature camera.

For simplicity in our discussions, we will use the wavefront phase for our analysis.

This choice allows the analysis to be independent of the specific hardware configuration so that the conversion from phase to surface errors or optical path difference (OPD) is straightforward. For example, a surface with height errors $\bar{h}(x_k, y)$ touched in reflection will produce a wavefront error. The height of the surface and the height of the stack formed by the height of the height can be written as:

$$I_{k1} = A\left[1 + V\cos\left(\frac{2\pi}{\bar{p}}(\bar{h}(X_k, y) + 0)\right)\right] = A\left[1 + V\cos\left(\frac{2\pi}{\bar{p}}\bar{h}(X_k, y)\right)\right], \quad (13)$$

$$I_{k2} = A\left[1 + V\cos\left(\frac{2\pi}{\bar{p}}\left(\bar{h}(X_k, y) + \frac{\bar{p}}{4}\right)\right)\right] = A\left[1 - V\sin\left(\frac{2\pi}{\bar{p}}\bar{h}(X_k, y)\right)\right], \quad (14)$$

$$I_{k3} = A\left[1 + V\cos\left(\frac{2\pi}{\bar{p}}\left(\bar{h}(X_k, y) + \frac{\bar{p}}{2}\right)\right)\right] = A\left[1 - V\cos\left(\frac{2\pi}{\bar{p}}\bar{h}(X_k, y)\right)\right], \quad (15)$$

$$I_{k4} = A\left[1 + V\cos\left(\frac{2\pi}{\bar{p}}\left(\bar{h}(X_k, y) + \frac{3\bar{p}}{4}\right)\right)\right] = A\left[1 + V\sin\left(\frac{2\pi}{\bar{p}}\bar{h}(X_k, y)\right)\right]. \quad (16)$$

Obviously, the phases of the four intensity signals are 90° out of phase, and we can use the same calculation method to get the average height of the area, that is, $$\bar{h}(X_k, y) = \frac{\bar{p}}{2\pi} \times \tan^{-1}\frac{I_{k4} - I_{k2}}{I_{k1} - I_{k3}} = \frac{p/(\tan\theta_1 + \tan\theta_2)}{2\pi} \times \tan^{-1}\frac{I_{k4} - I_{k2}}{I_{k1} - I_{k3}}, \quad (17)$$

The average height of each area can be calculated instantaneously through the image capture system so that the surface topography of the entire sensing surface can be obtained. In this invention, the applicant uses Matlab to simulate the transient steps phase shifting on the surface topography of the object.

In FIG. 2, proved the feasibility of this innovative technology, when a contact force is applied to the sensing plate 50, it makes the sensing plate deform. In order to facilitate the simulation, it is assumed that the deformation of the topography belongs to the deformation of the Gaussian type, and the morphology of the two-dimensional shape. According to equations (13)~(16) derive the intensity distribution of the overlay. It can be seen from the equations that due to the existence of the steps step height structure, the dazzling intensity distribution has four gray-scale intensities.

The conventional steps phase shifting technique requires a mobile station to push the grating plate to move, and it is impossible to detect the dynamic change of the surface topography in real time. While the instantaneous steps phase shifting technology of the present disclosure can instantly measure the dynamic behavior of the shape in one-snapshot without moving any objects. This is the biggest innovation highlight in this disclosure.

Figure 3:
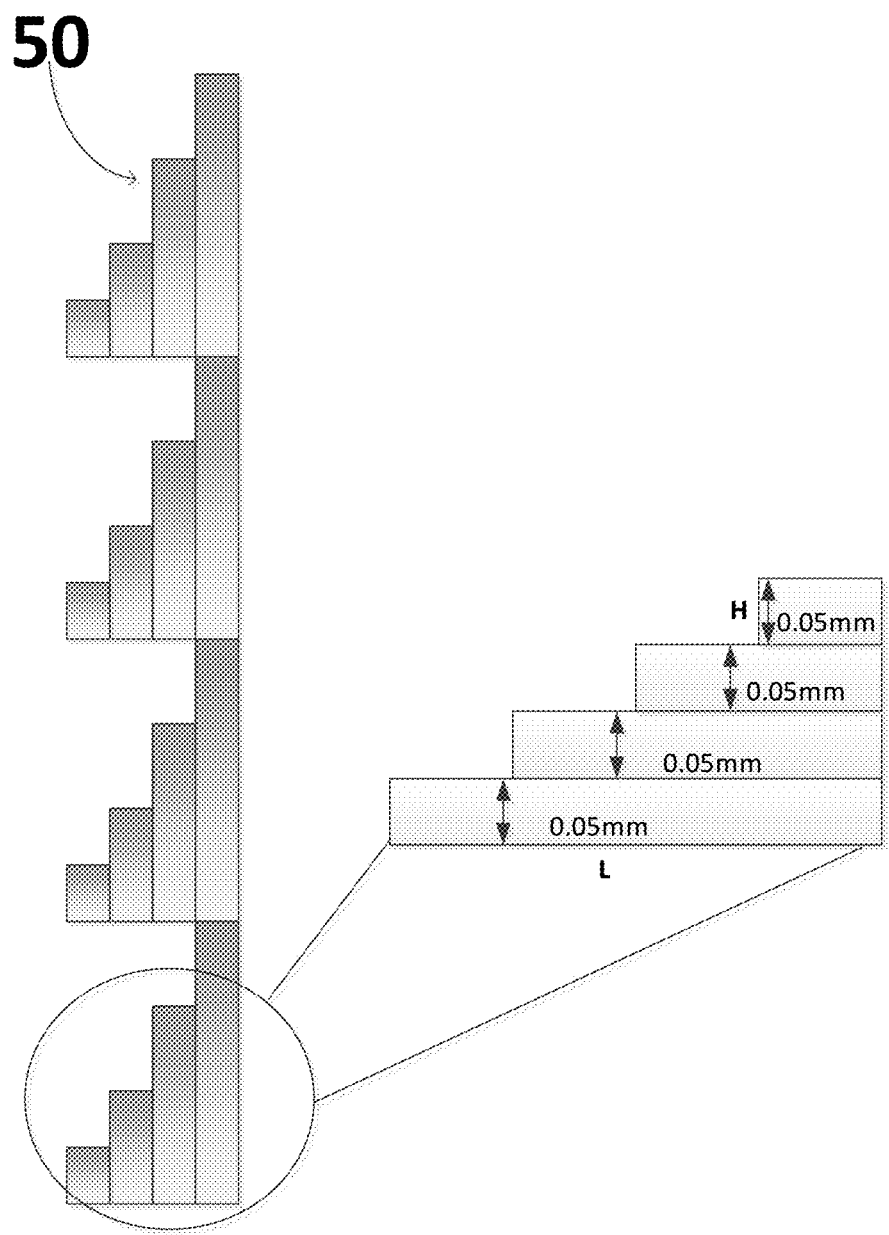
FIG. 3 shows a fabrication structure of the sensing plate of the tactile sensor device according to various embodiment of the present disclosure.

Please refer to FIG. 3 which shows a fabrication structure of the sensing plate of the tactile sensor according to various embodiment of the present disclosure. In terms of materials, in order to simulate a structure similar to that of human finger skin, the applicant chose PDMS, which has good light transmission. When the light source passes through PDMS, it is not easy to be absorbed, effectively increasing the sharpness of imaging; PDMS under normal circumstances. For low toxicity, in the conventional industrial operation, no special ventilation conditions are required, corrosion is not generated, non-flammable, and the safety and stability of the experiment are improved. In terms of measurement, PDMS has good electrical conductivity and is convenient for making signals. Transfer architecture; in addition, good biocompatibility, easy to interface with a variety of materials at room temperature, and high structure due to low Young's modulus Elastic and highly malleable, it is ideal for making bionic skin surface materials.

The topography deformation sensing plate 50 is a steps high-order periodic structure. According to the foregoing description, the step height of each step must be one quarter of the grating period. Setting a grating period of 0.2 mm, so the step height per step is 0.05 mm. Each set of step height is designed to be 2 mm. Since the infusion molding technique is suitable for making such components, the applicant used the infusion molding method to make the PDMS material into a sensing plate 50 of the tactile sensor. The other side of the topographic deformation sensing surface is the force-applying contact surface, and its overall appearance geometry is 20 mm×20 mm×1 mm.

There are two steps in the fabrication of the sensing plate structure, which can be divided into mold making and PDMS filling and demolding. In the mold making process, firstly, according to the PDMS shape of the designed PDMS sensing surface.

In terms of PDMS molding, the applicant used DOW CORNING® Sylgard 184 AB with primary agent and hardening. The agent is uniformly mixed in a ratio of about 10:1 by weight. The bubbles generated during mixing are floated to the surface by means of vacuuming to break them to make the surface smooth. The mold is evenly coated with a release agent, and a special water film is temporarily formed on the surface to prevent the material from sticking to the mold during filling and casting, and the film is not easily peeled off, thereby promoting the success rate of the mold. Then fill in the prepared mixture to ensure that the whole is even, put it in an oven of 120° C. and bake for one hour (bake time and temperature determine the hardness of PDMS). The curing reaction starts at the beginning of the mixing process, the initial phenomenon is the viscosity gradually increase, then the gel begins to appear and then turns into solid body elasticity, because the overall thickness is thick enough, put a small tape on the back corner, carefully release the mold to ensure the integrity of the whole, if the adhesion is tight, you can use ultrasonic vibration to separate the PDMS from the mold.

Figure 4:
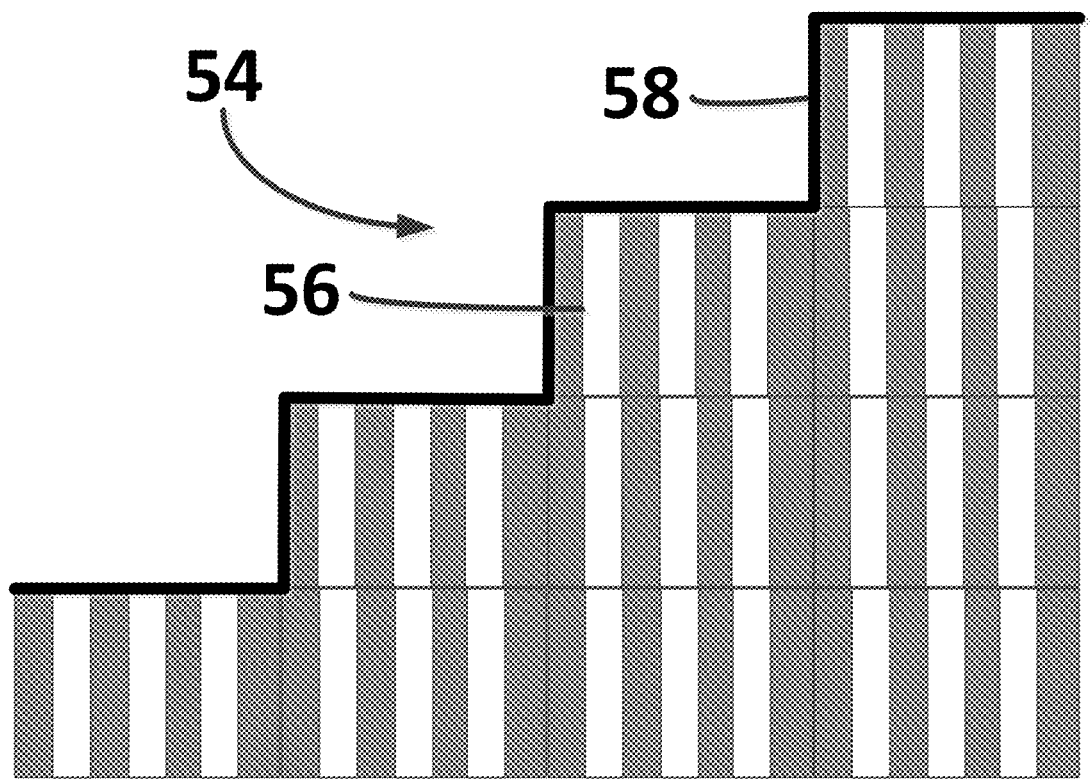
FIG. 4 shows a temperature sensing board of the tactile sensor device according to various embodiment of the present disclosure.

Please refer to FIG. 4 which shows the temperature sensing board of the tactile sensing device. The transmission technology of haptic information is indispensable, when a person interacts with an object, the physical properties that people feel. For example: stiffness, weight, shape, texture and temperature. In addition to the measurement of the force, temperature perception is also very important message, in order to achieve complete tactile sensing message, the applicant proposes a method for human skin temperature perception, so a temperature sensor that uses a CCD to capture the thermochromic paint of its signal. This thermochromic paint is usually used for temperature management. A thermochromic paint is applied to the sensing plate. When external force is applied to the contact surface, the temperature of the contact point passes through the sensing layer and is transferred to the heat sensitive paint.

The sensing board of the present disclosure is an uprising steps 54 disposed with the sensing plate 50, and the temperature sensing board 58 is set on the sensing plate 50. The temperature sensing board of the present disclosure used thermochromic paint sensing, which can accurately measure the sense the temperature of the touched point. When the robot is interacting with an object, the temperature of the tactile sensor device 1 start to raise, thus, the thermal paint is applied to the surface of the sensing plate 50 to ease the thermal issue. The when the external force is applied to the contact surface, the temperature of the contact point is transmitted to the heat-sensitive lacquer through sensing plate 50, and the color of the heat-sensitive paint 56 thereof changes due to thermal reaction. Therefore, the sensor can estimate the temperature of the contact point through the image captured by the miniature camera.

Further, the color changes due to temperature changes. The temperature of the contact point is estimated by the color change of the thermal paint and the relationship between temperature and color must first pass through the calibration procedure to obtain the calibration curve, and then use the calibration curve as the temperature measurement benchmark. The current calibration procedures are as follows:

We use the conventional thermal conductivity formula to estimate the temperature variation when the contact temperature is transmitted to the sensing surface. The formula is as follows:

$$\frac{\Delta Q}{\Delta t} = \lambda A \Delta T \frac{1}{x}, \quad (18)$$

where $\lambda$ is the thermal conductivity, A is the area of the thermal conductor, $\Delta Q/\Delta t$ is the heat flux (the heat transferred per unit time), and x is the thickness of the thermal conductor. $\Delta T$ is the temperature difference between the heat source and the object.

According to the literature, the thermal conductivity of PDMS is $\lambda_{PDMS}$=0.15 W/mK$^{33}$. Assume that the thickness of the sensing plate is 1 mm and the area is 2 mm×2 mm, and assuming a temperature difference $\Delta T$ is 9° C., according to equation (18), the heat passing through the PDMS per unit time can be calculated.

A plurality of heat conductive wires 56 with high thermal conductivity are set on one side of the sensing plate 50. In this practice, the heat conductive wires 56 are high thermal conductivity copper wire and coated with heat-sensitive paint on the sensing surface to increase the accuracy of temperature sensing. In other words, a copper wire with a length of 1 mm and a cross-sectional area of 0.05 mm$^2$ and a temperature difference $\Delta T$ is 9° C., is embedded in the sensing plate.

The heat transferred in a unit of time after the line is heated is high, and it means that the heat on the outside is easily transmitted to the inside. Due to copper wire The thermal conductivity far exceeds that of PDMS, and it has very good thermal conductivity when the copper wire has a very small area. So the applicant designed a copper wire with a small cross-sectional area and a large number to increase the thermal conductivity of the PDMS sensing plate 50, and when the copper wire is in a very small area, it still has very good thermal conductivity. When the product is small, the physical impact on the PDMS sensing board can also be reduced.

Figure 5A:
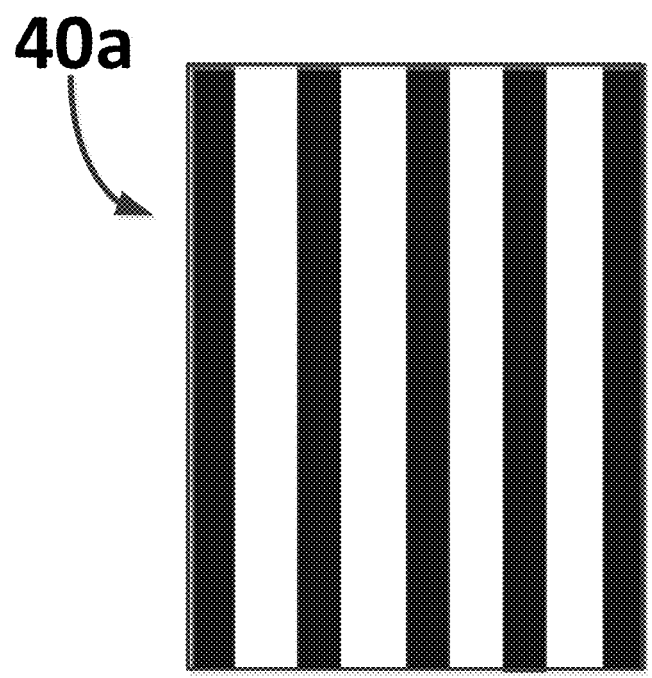
FIG. 5A-D show different interference pattern of the grating plate of the tactile sensor device according to various embodiment of the present disclosure.
Figure 5B:
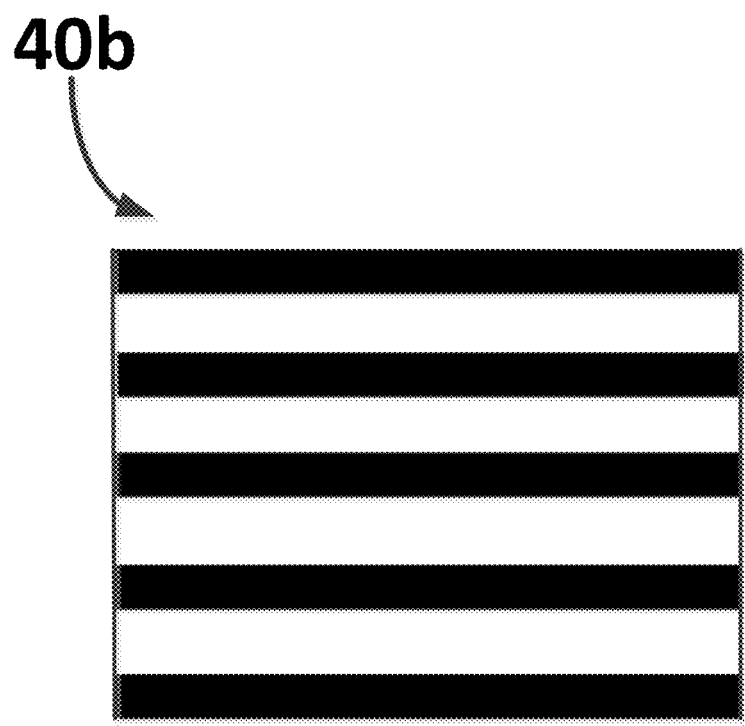
Figure 5C:
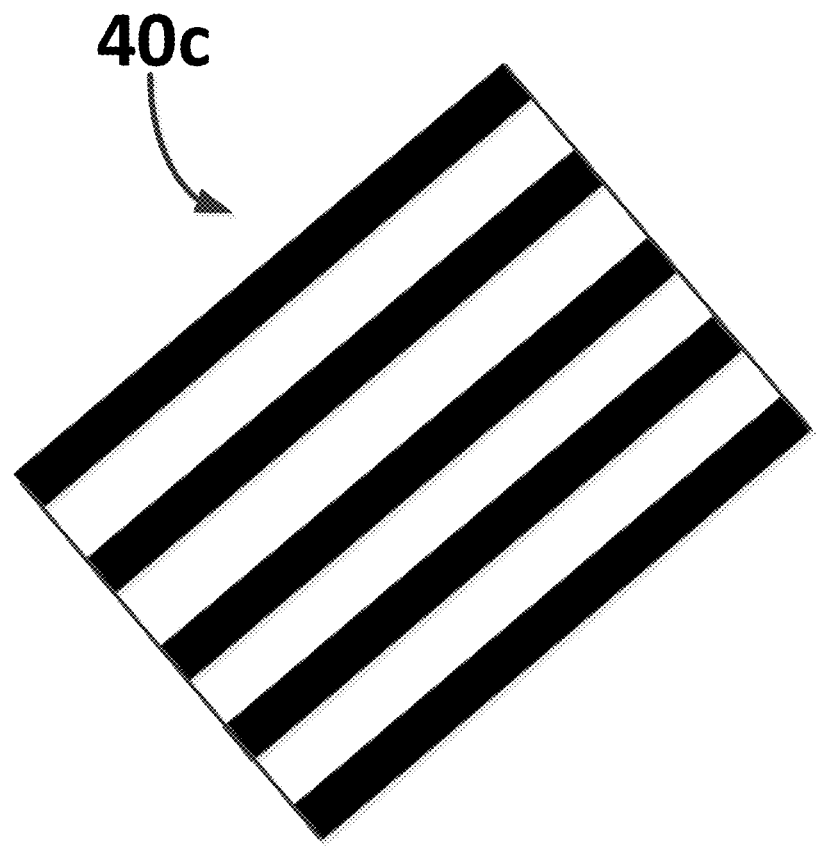
Figure 5D:
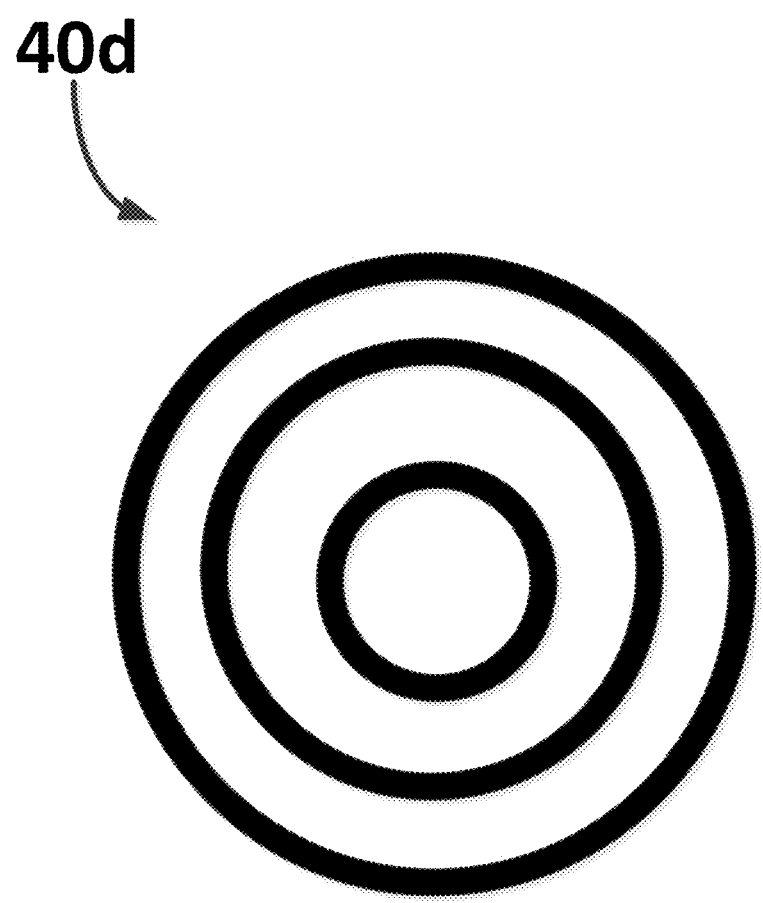

Please refer to FIG. 5A-D which shows different structures of a grating pattern of the grating plate of the tactile sensor according to various embodiment of the present disclosure, wherein a flat plate is made of a transparent material such as the PMMA or a glass. The area of the grating plate 40 is determined by the size of the outer frame, and the thickness is at least 10 nm or more. In one embodiment of the present application, the grating pattern is a long strip such as vertical straight lines 40a as shown in FIG. 5A with a grating period of at least 10 nm or more. In another embodiment of the present application, the grating pattern is a long strip such as horizontal straight lines 40b shown in FIG. 5B with a grating period of at least 10 nm or more. In another embodiment of the present application, the grating pattern is a long strip such as oblique line 40c shown in FIG. 5C with a grating period of at least 10 nm or more. In another embodiment of the present application, the grating pattern is around strip such as a circular shape 40d shown in FIG. 5D with a grating period of at least 10 nm or more.

The foregoing description of the disclosed exemplary embodiments are provided to enable any person of ordinary skill in the art to make or use the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A tactile sensor device applied to a robot, comprising:
   a single beam LED light source mounted to a substrate, generating a light beam;
   a grating plate disposed on said single beam LED light source, interfering said single light beam from said single beam LED light source, and generating a first plurality of fringes;
   a sensing plate disposed on said grating plate, reflecting said first plurality fringes to form a plurality of reflected fringe; and
   a miniature camera mounted to said substrate, capturing said reflected fringes from said sensing plate to form an image;
   wherein a microcontroller electrically connects to said miniature camera for processing said image captured by said miniature camera to determine a characteristic of surface touched by an object, and said single beam LED light source is aligned with said grating plate at 45-degree angle to allow the fringes generated by said grating plate to cause shadows on the sensing plate.

2. A tactile sensor device applied to humanoid robot, comprising:
- a single beam LED light source mounted to a substrate, generating a light beam;
- a grating plate disposed on said single beam LED light source, interfering said single light beam from said single beam LED light source, and generating a plurality of first fringes;
- a sensing plate disposed on said grating plate, reflecting said plurality of first fringes to form a plurality of reflected fringes; and
- a miniature camera mounted to said substrate, capturing a shadow overlay image generated from said plurality of reflected fringes in one-snapshot;
- wherein said sensing plate includes an instantaneous steps phase shifting high-order structure, said instantaneous steps phase shifting comprises a plurality of heights structure, which fill an entire shape of a sensing surface.

3. The tactile sensor device of claim 2, wherein said grating plate is made of a transparent material such as PMMA or glass, an area of said grating plate is determined by a size of a hollow frame, and the thickness thereof is at least 10 nm or more, said grating pattern is a long strip (straight line, oblique line) and a circular shape with a grating period of at least 10 nm or more.

4. The tactile sensor device of claim 3, wherein an outer shape of said hollow frame needs to be matched with a joint of a mechanical finger.

5. The tactile sensor device of claim 2, wherein said instantaneous steps phase shifting instantly measure a dynamic behavior of a shape in one-snapshot without moving any objects.

* * * * *